US006947637B2

(12) United States Patent
Smith (10) Patent No.: US 6,947,637 B2
(45) Date of Patent: Sep. 20, 2005

(54) MEASUREMENT OF FIBER STRAIN DURING PROCESSING

(75) Inventor: James A. Smith, Painted Post, NY (US)

(73) Assignee: Corning Incorporated, Corning, NY (US)

(*) Notice: Subject to any disclaimer, the term of this patent is extended or adjusted under 35 U.S.C. 154(b) by 251 days.

(21) Appl. No.: 10/206,708

(22) Filed: Jul. 25, 2002

(65) Prior Publication Data

US 2003/0035626 A1 Feb. 20, 2003

Related U.S. Application Data (60) Provisional application No. 60/311,166, filed on Aug. 9, 2001, and provisional application No. 60/362,115, filed on Mar. 5, 2002.

(51) Int. Cl.$^7$ .................................................. G02B 6/34
(52) U.S. Cl. ............................................ 385/37; 385/12
(58) Field of Search .................................... 385/12, 37

(56) References Cited

U.S. PATENT DOCUMENTS

| | | | |
|---|---|---|---|
| 5,243,609 A | * 9/1993 | Huber | 372/19 |
| 5,591,965 A | * 1/1997 | Udd | 250/227.18 |
| 5,684,297 A | * 11/1997 | Tardy | 250/227.14 |
| 5,698,848 A | * 12/1997 | Belk | 250/227.11 |
| 5,760,391 A | * 6/1998 | Narendran | 250/227.14 |
| 5,907,403 A | * 5/1999 | Andrews et al. | 356/352 |
| 5,945,666 A | * 8/1999 | Kersey et al. | 250/227.14 |
| 6,056,436 A | * 5/2000 | Sirkis et al. | 374/161 |
| 6,137,565 A | * 10/2000 | Ecke et al. | 356/35.5 |
| 6,403,949 B1 | * 6/2002 | Davis et al. | 250/227.27 |
| 6,422,084 B1 | * 7/2002 | Fernald et al. | 73/705 |

OTHER PUBLICATIONS

Du et al., "Fiber Bragg Grating Cavity Sensor for Simultaneous Masurement of Strain and Temperature", IEEE Photonics Technology Letters, vol. 11, No. 1, Jan., 1999, pp. 105–107.*

* cited by examiner

*Primary Examiner*—Ellen E. Kim
(74) *Attorney, Agent, or Firm*—Randall S. Wayland; Robert L. Carlson

(57) ABSTRACT

A method and system for determining strain impressed on an optical fiber at a possibly indeterminate temperature. The fiber (14) is formed with at least two sensors having different strain and temperature characteristics, preferably a Bragg Fabry-Perot sensor having a Fabry-Perot cavity (16) formed between two like Bragg gratings (10, 12) and another Bragg grating 18 of a different pitch written into the Fabry-Perot cavity. Many such pairs can be written if the Bragg gratings reflect in different bands. The fiber is irradiated with broadband light, and the reflection is spectrally separated to produce separate spectra for all sensors. Wavelength shifts from two types of sensors can be correlated with strain and temperature according to predetermined variations of the shifts with known strain and temperature changes.

17 Claims, 9 Drawing Sheets

MEASUREMENT OF FIBER STRAIN DURING PROCESSING

This application claims priority to and the benefit of U.S. Provisional Application No. 60/311,166 filed Aug. 9, 2001 and U.S. Provisional Application No. 60/362,115, filed Mar. 5, 2002.

BACKGROUND OF THE INVENTION

1. Field of the Invention

The invention relates generally to optical measurement systems. In particular, the invention relates to a method of measuring strain induced in an optical fiber during its manufacture or other processing.

2. Background Art

Optical fiber is being manufactured in large quantity for use as the transmission medium in communications networks. Numerous performance and reliability requirements imposed on the manufactured fiber can be met only by continued monitoring of the manufacturing process and its effect on the fiber. The manufacture and further processing of optical fiber involves several processes subjecting the fiber to a degree of mechanical stress and to moderately high temperatures, for example up to 125° C. The stress may be imposed by wrapping the fiber around a pulley as it is being continuously pulled through the processing station, as it is stretched between two pulleys, or as it is pulled through a die. Even if the total time that the fiber is being stressed at any point is relatively short, that time may be sufficient to induce sub-critical growth of preexisting flaws within the fiber. Such flaws are likely to impact the ultimate mechanical strength of the fiber, thereby decreasing the reliability of the field fiber. Reliability models have been created to estimate the strength of the fiber and associated fiber optic cables after their manufacture and processing. Reliability models for optical fiber are typically based on three sets of data: the size distribution of flaws or cracks with the fiber; growth parameters of fatigue cracks; and, the stress-time profile which the fiber experiences during processing. Heretofore, direct measurements of the stresses exerted on an optical fiber during high-speed processing has not been possible. As a result, the stress-time profile of the fiber has been induced from other measurements.

Furthermore, measurement of stress and strain in a manufacturing environment would be valuable for process monitoring, for equipment design, and to trouble shoot manufacturing lines.

For these reasons, it is desirable to be able to dynamically measure the stress to which an optical fiber is being subjected in a realistic manufacturing environment.

SUMMARY OF THE INVENTION

A sensor is an optical structure formed into an optical fiber that results in a reflection or transmission spectrum with well defined characteristics, such as peaks or notches. The optical fiber is formed with two different types of sensors, each sensor having a different ratio of the wavelength shift with respect to changes in strain and temperature. Preferably, the sensors are associated in a closely spaced pair, and a plurality of pairs are formed along the fiber.

Two types of such sensors include a fiber Bragg grating sensor and a Fabry-Perot sensor having a cavity formed between partial reflectors. A Bragg Fabry-Perot sensor includes matched Bragg gratings formed as the Fabry-Perot reflectors. The reflection bandwidth of the Bragg reflectors of the fiber Bragg grating sensor and the Bragg Fabry-Perot sensor have reflection spectra in different bands. A plurality of such sensors have non-overlapping Bragg reflection spectra.

A fiber formed with such sensors is irradiated with light spanning the various reflection spectra. The light reflected (or transmitted) is spectrally analyzed. The spectra are analyzed to determine the shifts of the spectral characteristics, for example, shifts of the central wavelengths of the fiber Bragg grating sensor and the Fabry-Perot sensor. The two shifts are compared with reference responses of the two sensor types to enable the extraction of the strain and temperature to which the two sensors are subject.

The reference response may be calculated or measured. The derivatives of the central wavelengths with respect to strain and temperature are typically linear and do not vary appreciably with respect to the typical wavelengths used. Therefore, two sets of two derivatives may be measured or calculated for the two sensor types, and the derivatives applied to reference central wavelengths of each of the sensors to determine the dependence of the central wavelength shifts as a function of strain and temperature.

The measurement may be repetitively performed at a high sampling rate of, for example, greater than 7 kHz to provide a dynamic measurement of the strains experienced by each sensor. A fiber bearing a plurality of such sensors may be continuously passed through a realistic manufacturing or other stressing process while such dynamic strain measurement is being performed to measure strain at one or more points in the process performed under realistic conditions.

DETAILED DESCRIPTION OF THE PREFERRED EMBODIMENTS

Strain and temperature can be dynamically measured in a fiber being processed by an optical method in which two types of sensors are written into a fiber. A sensor as used here refers to a structure impressed into the fiber to form an axially extending optical structure that produces a wavelength dependent spectrum for optical reflection of light axially propagating along the fiber although the transmission mode may be used if desired. A pair of associated sensors of different types is called a hybrid sensor.

One such sensor is a fiber Bragg grating (FBG) consisting of a pattern of refractive index variations called lines formed transversely to the fiber axis on a fixed pitch. A large number of lines is sufficient to form a Bragg grating. When operated in first order, a Bragg grating will reflect light having a wavelength that is twice the pitch of the Bragg grating, taking into account the effective refractive index of the fiber.

Another such sensor is a Fabry-Perot (FP) cavity defined between two partial reflectors or mirrors. An FP cavity has a reflection spectrum strongly dependent upon the length of the cavity relative to the probing wavelength. In general terms, the reflection pattern repeats on a wavelength scale, called the free spectral range, across which one additional wavelength is transmitted through the cavity. Typical cavity lengths used for 1.5 µm radiation are 1 to 3 cm. Although semi-transparent dielectric mirrors of titanium oxide have been proposed, it is easier to form the two end mirrors by a pair of matched Bragg gratings formed in the fiber to produce a Bragg Fabry-Perot (BFP) sensor. Although the BFP reflection spectrum is influenced both by the FP spectrum of its cavity and by the Bragg spectrum of its grating mirrors, it is still possible to identify the FP reflection spectrum.

The Bragg gratings of either sensor can be written into a silica optical fiber by well known techniques, typically using an intense UV light source scanned in the grating pattern across the fiber to induce changes in the effective refractive index. If the fiber covering can be made transparent to UV, the fiber writing can be performed on unstripped fiber.

A major problem with using either sensor alone for measuring strain or temperature is that the optical properties, particular the reflectivity, of the sensor depend both on strain and on temperature. Temperature affects the Bragg pitch or Fabry-Perot cavity length as does strain and additionally influences optical properties of the material such as its refractive index. It is difficult to separate temperature and strain effects in a single sensor. However, if two sensors of differing operation are used, it is likely that their reflectivities do not vary in the same proportionality to strain and temperature. This has been found to be the case with fiber Bragg gratings and Fabry-Perot cavities written in the same fiber. Let $\Theta_{FP}$ be the center wavelength of the reflectivity spectrum of the hybrid Bragg Fabry-Perot sensor and $\Theta_{BG}$ be the center wavelength of the reflectivity spectrum of the Bragg fiber grating sensor. It has been determined that the two center wavelengths have different proportionalities in their variations with temperature T and with strain $\epsilon$, that is, $$\frac{\frac{\partial \Theta_{FP}}{\partial T}}{\frac{\partial \Theta_{FP}}{\partial \epsilon}} \neq 1 \quad (1)$$
$$\frac{\frac{\partial \Theta_{BG}}{\partial T}}{\frac{\partial \Theta_{BG}}{\partial \epsilon}}$$

If this condition holds, then sensors of two different types are monitored for shifts in their center wavelengths $\Delta\Theta_{FP}$, $\Delta\Theta_{BG}$. Calculations can then be performed to obtain the temperature T as well as the strain $\epsilon$ from the center wavelength shifts.

Figure 1:
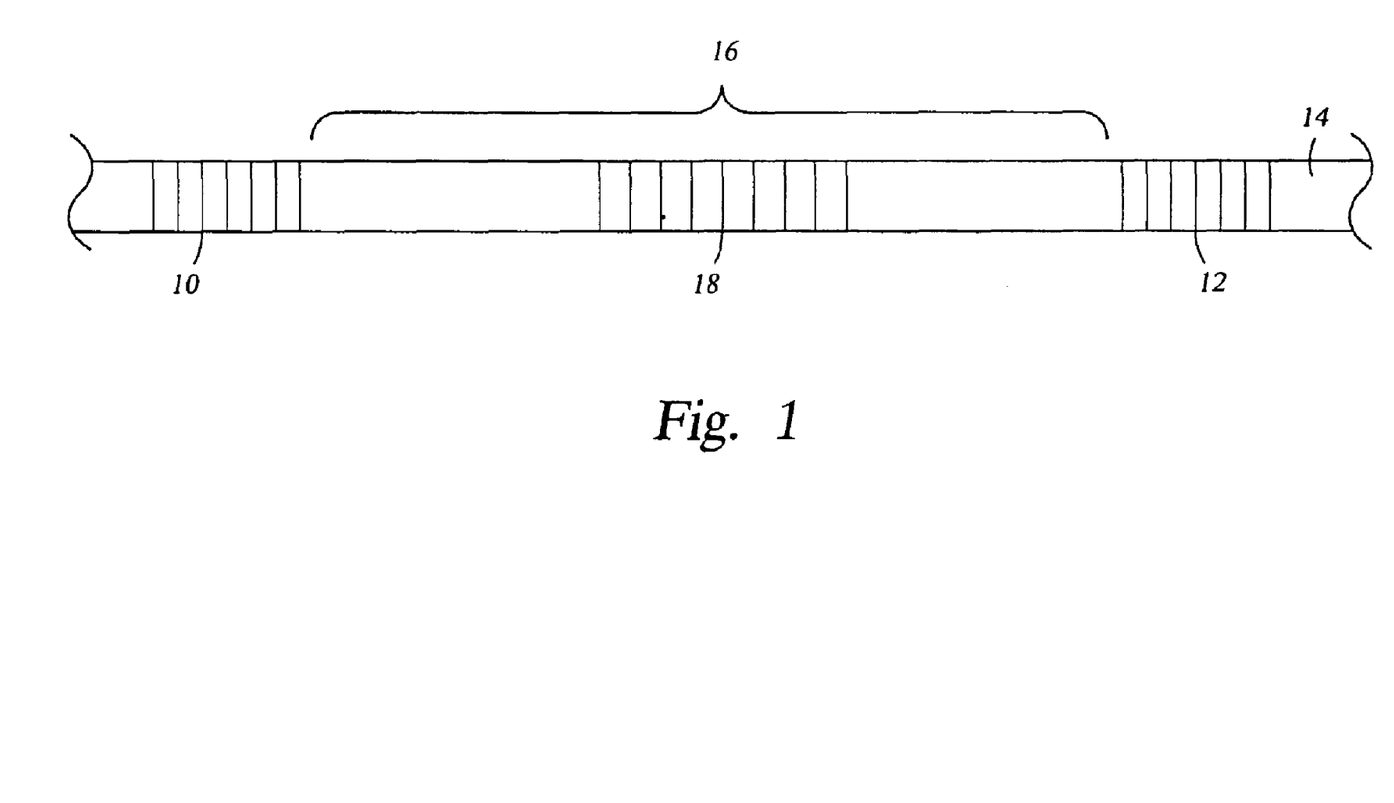
FIG. 1 is a schematic side view of an optical fiber on which is written a hybrid strain sensor of the invention.

One embodiment of the invention is schematically illustrated in FIG. 1. A Bragg Fabry-Perot (BFP) sensor includes two Bragg reflectors 10, 12 written into an optical fiber 14 and defining between them a Fabry-Perot cavity 16 although it is understood that the Bragg Fabry-Perot oscillations depend as well upon the specifics of the Bragg reflectors 10, 12. The Bragg reflectors 10, 12 have equal pitches to reflect light in a band around a central wavelength $\lambda_{FP}$ of the cavity. While the envelope of the reflection spectrum is determined by the Bragg reflectors 10, 12, sharp transmission peaks corresponding to the central wavelength depend critically upon the length of the Fabry-Perot cavity 16. A fiber Bragg grating (FBG) sensor includes a fiber Bragg grating 18 also written into the fiber 14, preferably within the Fabry-Perot cavity 16. The schematic illustration does not fully illustrate the width of the grating lines nor the radial parts of the fiber 14, such as its core, cladding, and protective covering.

The fiber Bragg grating 18 has a pitch different from that of the Bragg reflectors 10, 12 so that it reflects light around a central wavelength $\lambda_{BG}$. The two central wavelengths $\lambda_{FP}$ and $\lambda_{BG}$ differ sufficiently that the respective reflection spectra of the two sensors can be easily separated when both are simultaneously irradiated with broad-wavelength light. An example is that the reflection spectrum of one sensor through the anticipated strains and temperatures occur in a respective bandwidth, and the wavelength bands of different sensor are separated by at least 3 dB, preferably by more than 10 dB. That is, the respective bandwidth is defined by a narrow portion of the spectrum having a maximum reflectivity, that all reflectivities outside the bandwidth are less than the maximum reflectivities by at least a factor of −3 or −10 dB, and that none of the bandwidths of all the sensors overlap.

Figure 2:
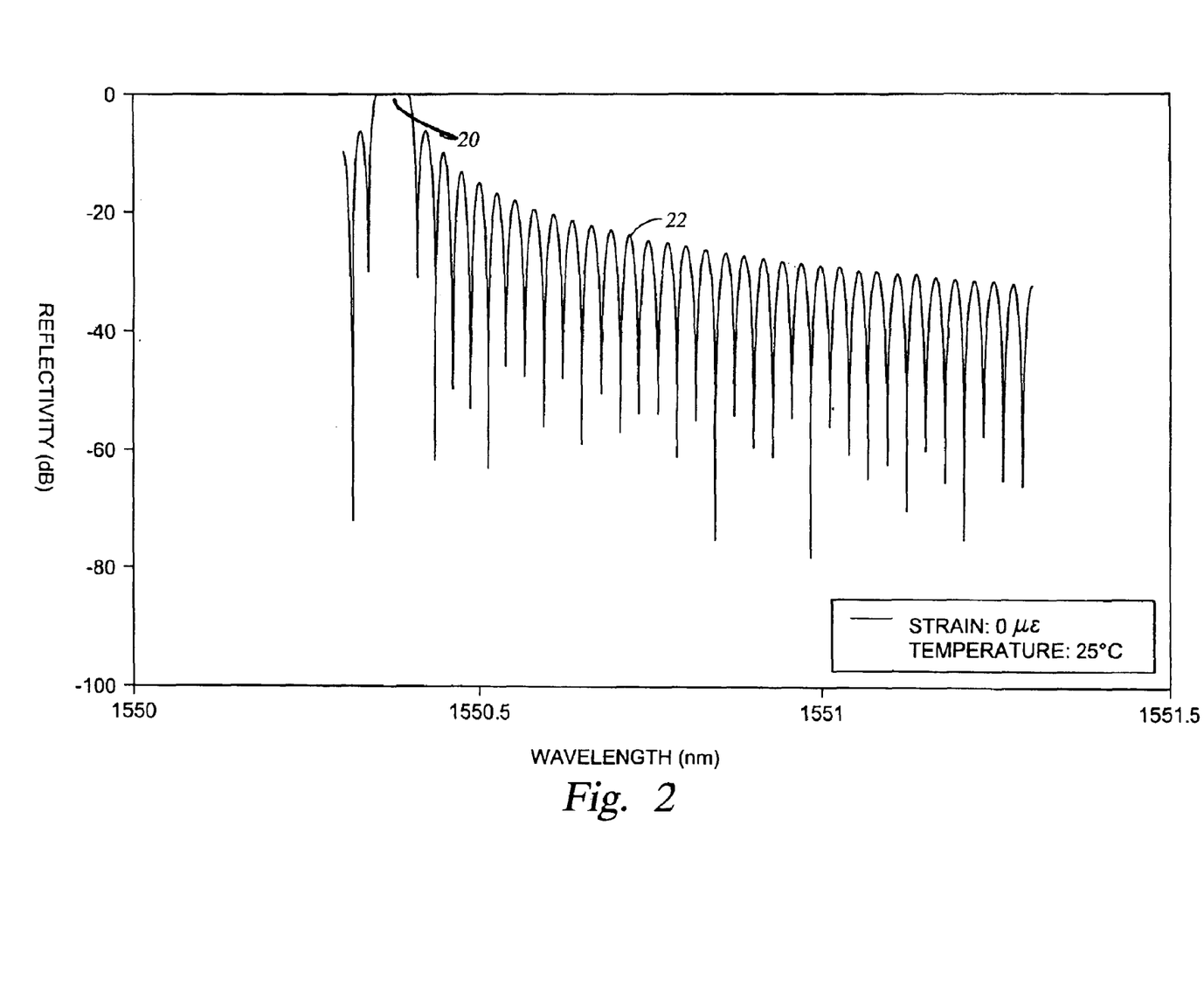
FIG. 2 is a reflection spectrum for a fiber Bragg grating.

A sample reflection spectrum for a FBG sensor under no strain and at 25° C. is illustrated in FIG. 2. The central wavelength $\lambda_{BG}$ for the FBG sensor occurs at the middle of a peak 20 near 1550.4 nm. The spectrum is substantially symmetric about the central wavelength $\lambda_{BG}$ although only part of it is illustrated and rapidly falls by more than 30 dB from the near unity reflectivity at the central wavelength $\lambda_{BG}$. The length of the Bragg grating along the fiber determines the bandwidth of the reflection spectrum. On a linear scale, the reflectivity spectrum appears more peaked about the central wavelength $\lambda_{BG}$ than on the illustrated logarithmic scale, and thus the wavelength of the peak is easily ascertained from experimental values. The rapidly oscillating side lobes 22 arise from the finite length of the fiber Bragg grating. The center wavelength and effective index of refraction with the FBG sensor are affected by changes in strain and temperature.

Figure 3:
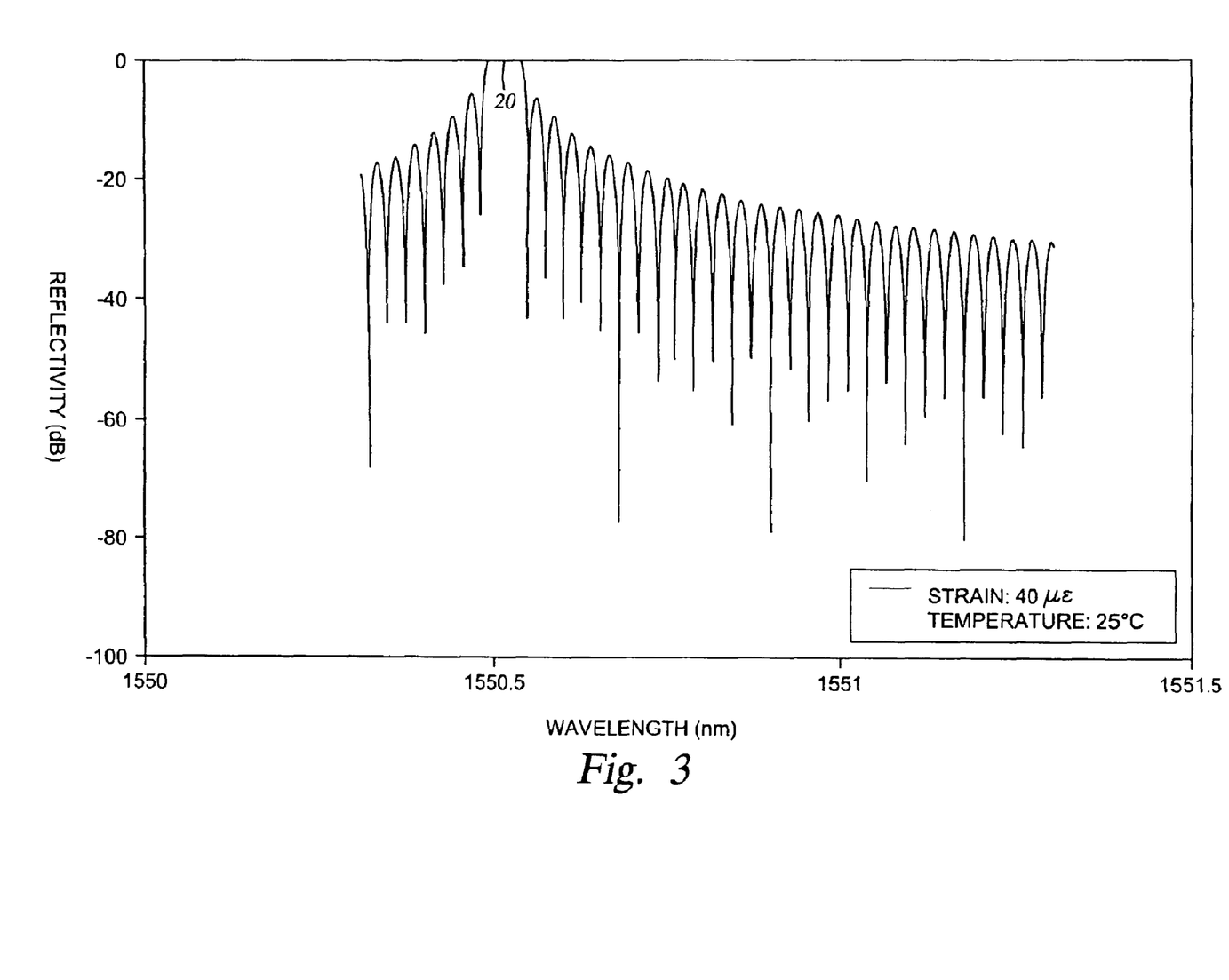
FIG. 3 is a reflection spectrum for the fiber Bragg grating of FIG. 2 under tensile strain.

Under strain, the FBG spectrum shifts in a fairly simple manner. A reflection spectrum for the FBG sensor under tensile mechanical loading producing a strain of 40 µε is illustrated in FIG. 3. The strain is expressed by the measure of µε where µ is $10^{-6}$ and $\epsilon = \Delta L/L$, where L is the length of a section of fiber and $\Delta L$ is the change of that length relative to the unstrained condition. It is assumed that the entire sensor extending along a length of fiber is under equal strain. The FBG spectrum shows a shift of the peak 20 and its central wavelength $\lambda_{BG}$ to just above 1550.5 nm. The change of the center wavelength with respect to temperature for this fiber is about 0.014 nm/° C., and the change with respect to strain is about 0.0019 nm/µε.

Figure 4:
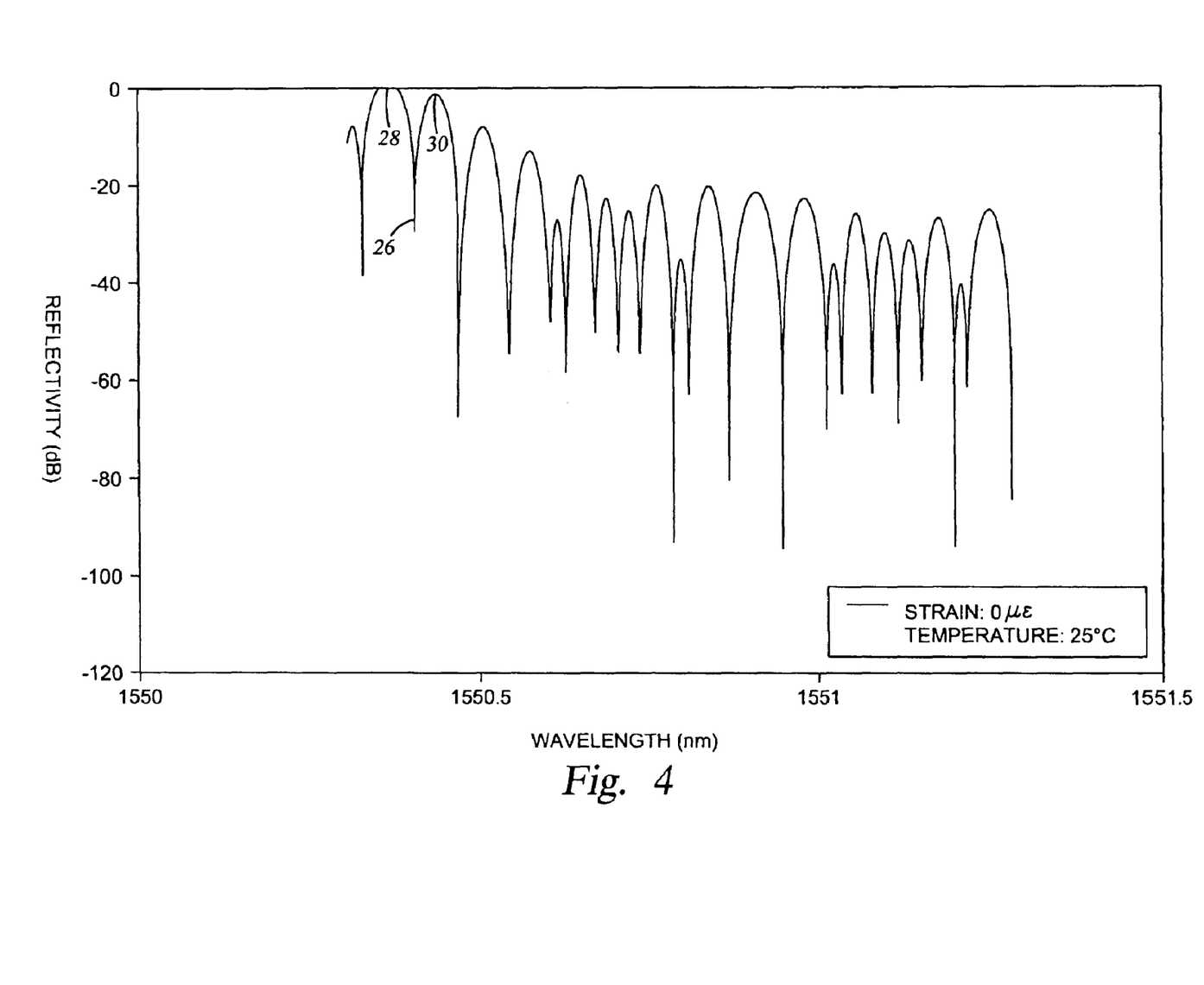
FIG. 4 is a reflection spectrum for a Bragg Fabry-Perot sensor written on a fiber.

The situation with a Bragg Fabry-Perot sensor is more complex. A sample reflection spectrum for a Bragg Fabry-Perot sensor under no strain and at 25° C. is illustrated in FIG. 4. The central wavelength $\lambda_{FP}$ for the sample Fabry-Perot sensor is chosen to also be 1550.4 nm, but in a combined hybrid sensor the two central wavelengths need to be substantially different. The BFP spectrum is a combination of the FBG reflection spectrum of FIG. 2 and a Fabry-Perot transmission spectrum, which to a first order approximation is a repetitive pattern of similarly sized peaks separated by the free spectral range defined by the cavity length. For a FBG reflection spectrum, which does not include phase information, the Fabry-Perot central wavelength $\lambda_{FP}$ may occur at a notch or minimum 26 between two peaks 28, 30, both of which are formed from the Bragg grating reflection peak. The reflection minimum 26 is a transmission maximum associated with the Fabry-Perot cavity. The Fabry-Perot cavity selectively transmits wavelengths that are integral multiples (with very high multiplicity for usual configurations) of a relatively small length associated with the cavity length and determines to a first order approximation the spacing between the peaks. The spacing between the transmitted spectral peaks is determined by the effective cavity length formed by the partial mirrors. The bandwidth and amplitude of the spectral peaks are determined by the mirror reflectivity while the changes in the locations of the spectral peaks are caused primarily by changes in the effective cavity length, which is influenced both by strain and temperature.

Figure 5:
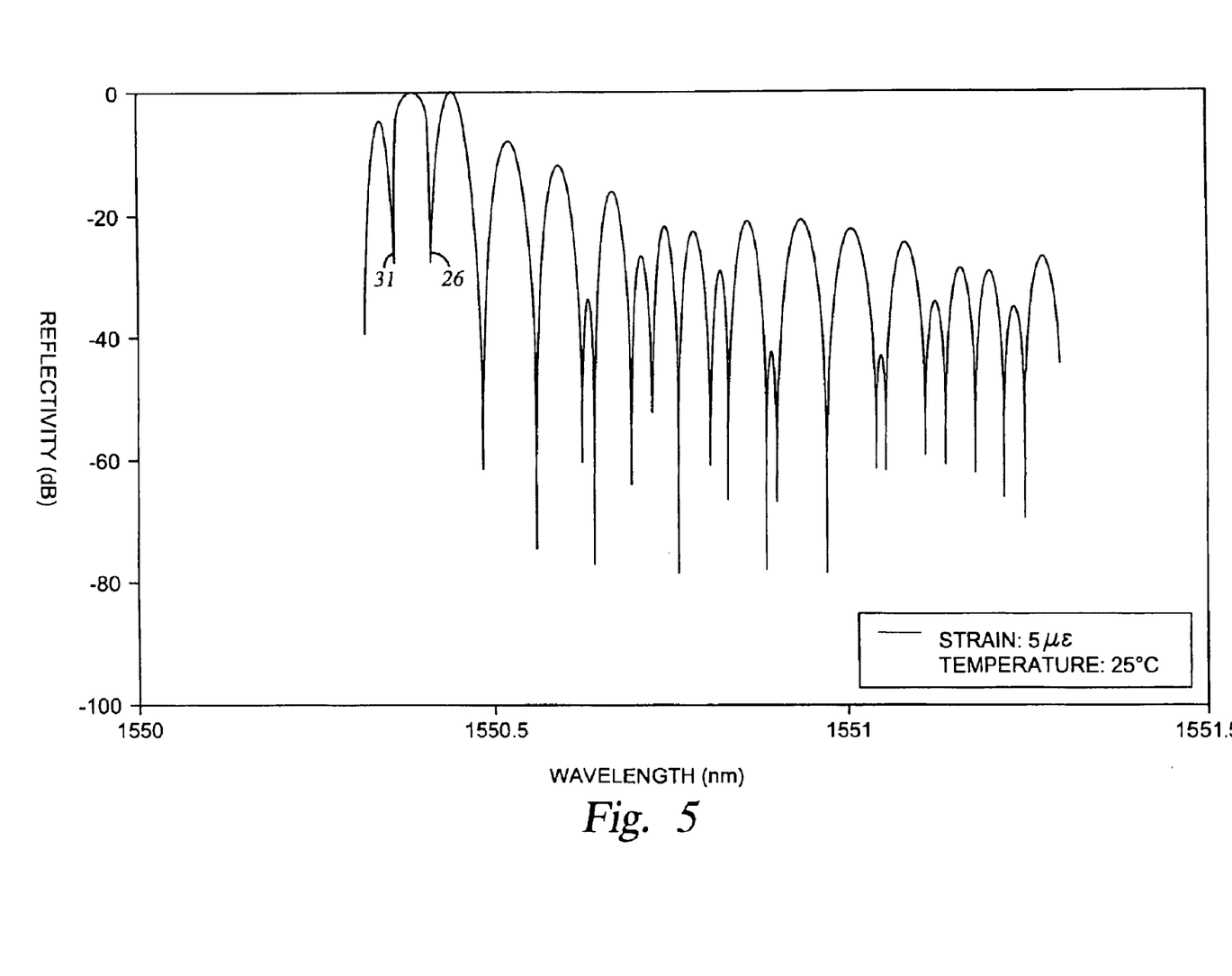
FIGS. 5 through 7 are reflection spectra for the Bragg Fabry-Perot sensor of FIG. 3 under increasing amounts of tensile strain.
Figure 6:
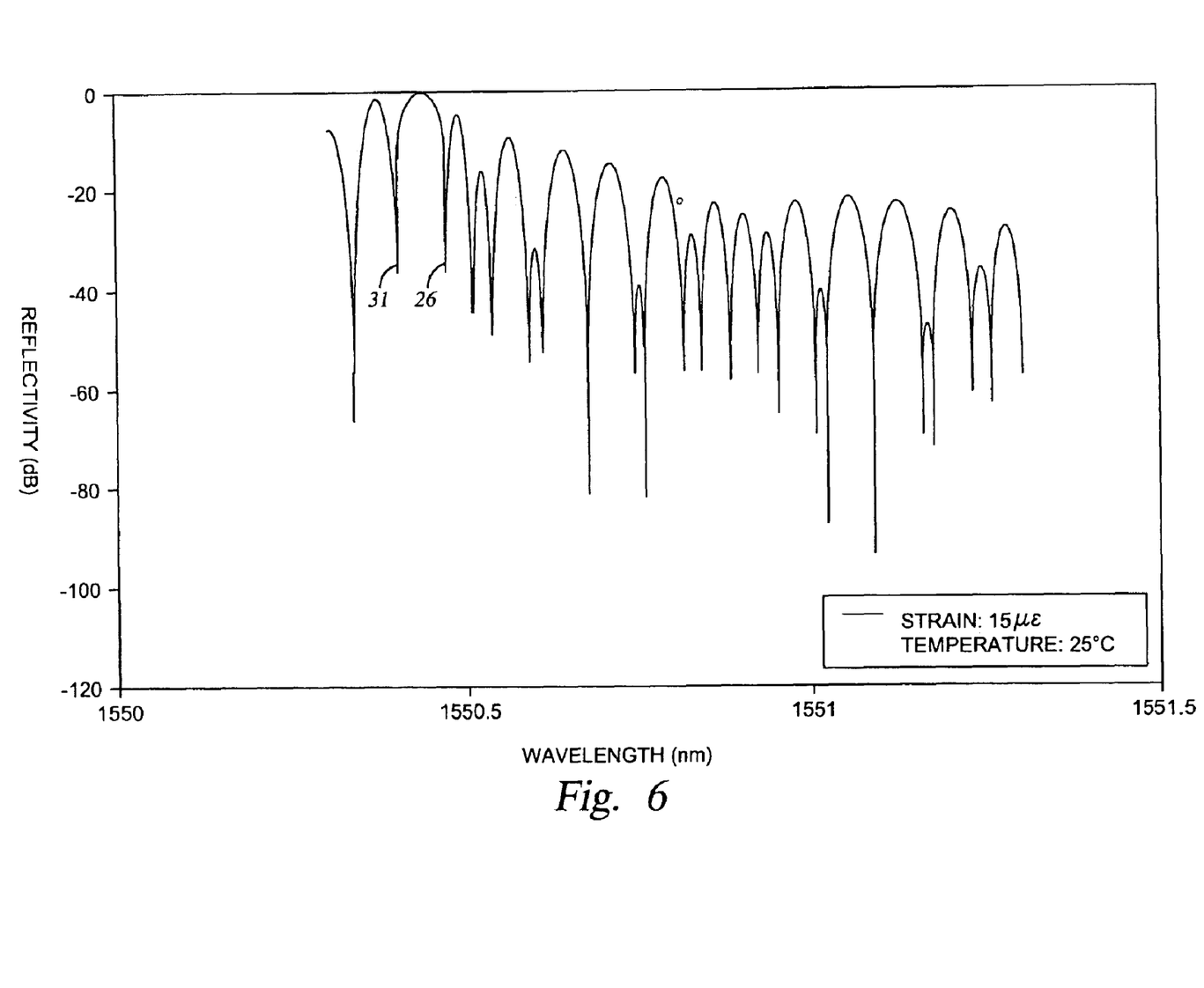
Figure 7:
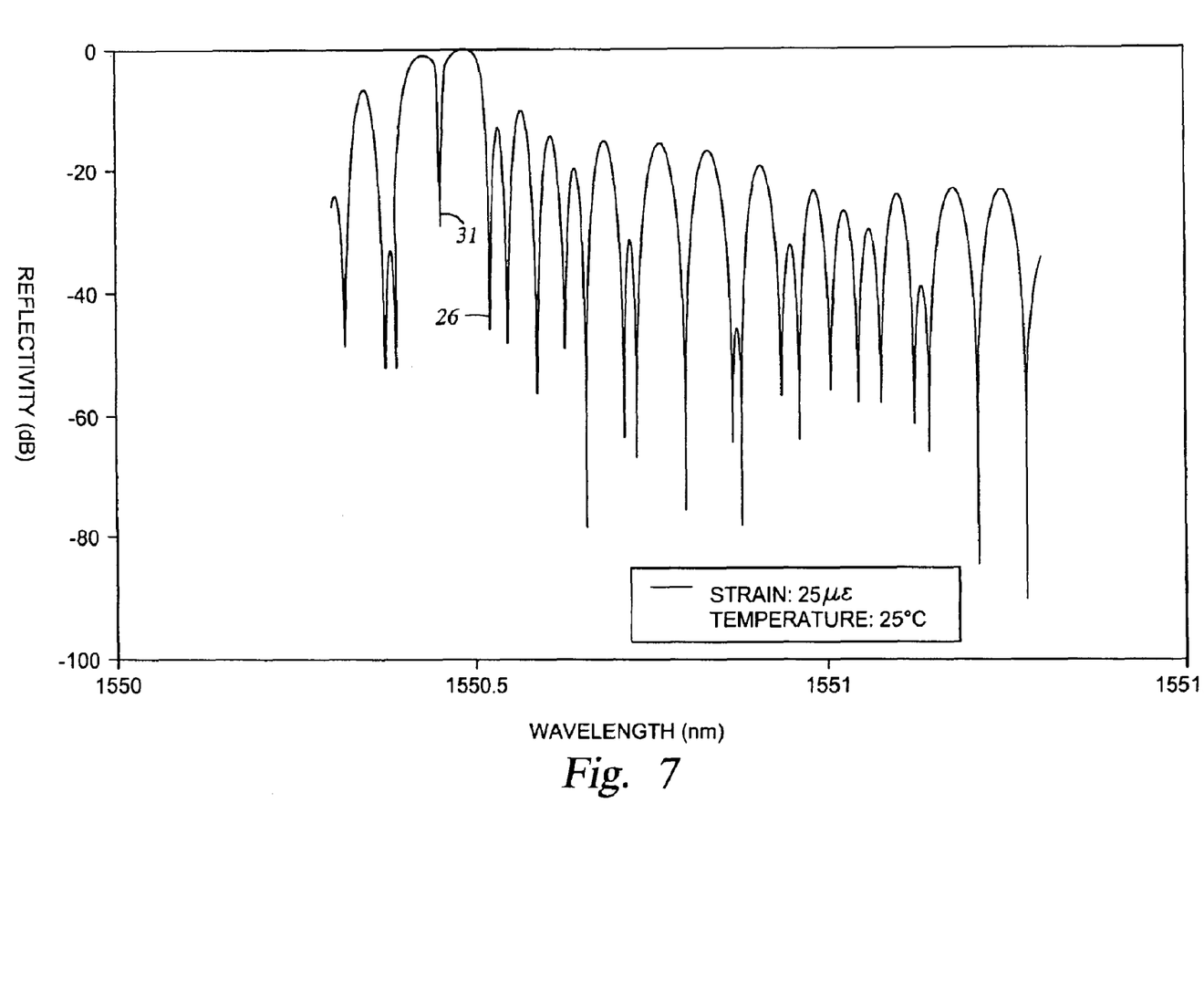

Strain induces a more complex modification in the BFP spectrum. A strain of 5 $\mu\epsilon$ produces a reflection spectrum illustrated in FIG. 5 in which the minimum 26 is shifted upwardly to about 1550.45 nm. The shifted spectrum can be visualized as the Bragg grating spectrum of the two end mirrors sliding through the free spectral range of the Fabry-Perot cavity. However, there arises another Fabry-Perot transmission maximum resulting in a second reflection minimum 31 at about 1550.35 nm. A strain of 15 $\mu\epsilon$ produces a reflection spectrum illustrated in FIG. 6 in which the original minimum 26 is shifted to just below 1550.5 nm but the transmission line within the new free spectral range produces a stronger second minimum 31. A further increase in strain to 25 $\mu\epsilon$, as illustrated in FIG. 7, shows a stronger secondary reflection minimum 31 at about 1550.45 nm corresponding to the new free spectral range with former major minimum 26 becoming submerged in the side lobes, and the cycle repeats as the Bragg grating spectrum begins to slide through another free spectral range.

Extraction of the shifts of the Fabry-Perot maxima is eased if the measurements are being performed frequently enough with respect to the loading and unloading and temperature variation rates that the Fabry-Perot transmission peaks can be tracked as they slide along the Bragg spectrum, thereby allowing changes of the Fabry-Perot cavity length over multiple free spectral ranges.

For a sufficiently large strains, the wavelength shift of the reflected minimum (transmitted maximum) of the BFP sensor can exceed the free spectral wavelength range. In measurement formats where a single reflection minimum is monitored, tracking of the shift of the reflected minimum change from tracking the minimum leaving (entering the next higher or next lower free spectral range) the free spectral range to tracking the minimum entering the free spectral range. The reflected minimum will enter the free spectral range being monitored from the side of the range opposite that through which the original reflected minimum leaves. To allow passage of the entering reflected minimum, the bandwidth of the FBG reflectors of the BFP sensor must be larger than the free spectral range of the BFP sensor. The amount of shift of the reflected minimum in cases where the shift exceeds the free spectral range is found by adding or subtracting (depending upon whether the shift is toward a higher or lower wavelength) the free spectral range and the measured shift. The algorithm used to calculate the wavelength shift of the BFP reflected minimum is adapted to account for wavelengths shifts which exceed the free spectral range of the BFP pattern.

Analysis of these results show that the change of the transmission wavelength with respect to temperature for the same fiber is about 0.011 nm/° C., and the change with respect to strain is about 0.0012 nm/$\mu\epsilon$. Full calculations have demonstrated nearly linear response for strains up to 20,000 $\mu\epsilon$ and temperatures between 25° and 250° C. and with virtually no cross term.

Figure 8:
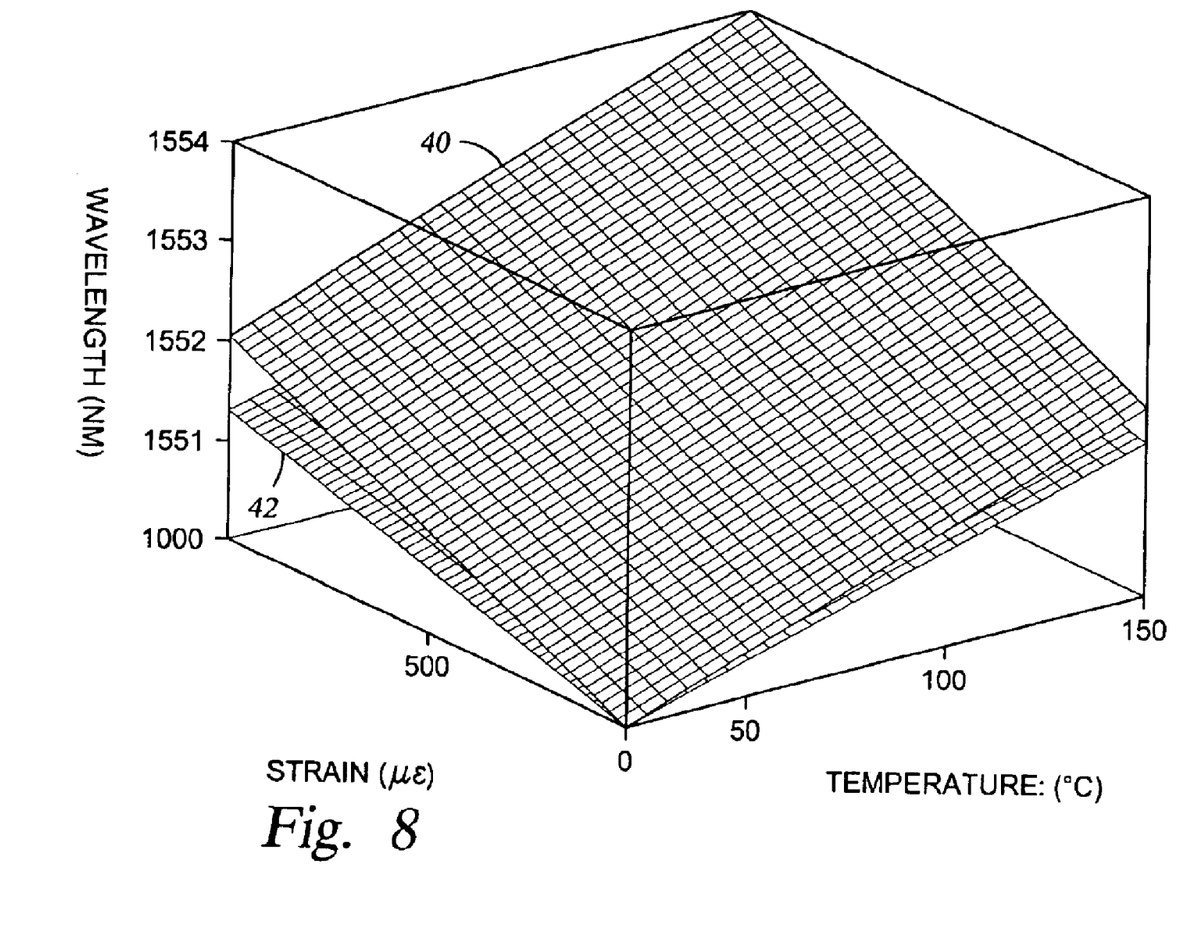
FIG. 8 is a three dimensional plot of the wavelength shifts for the sensors of FIGS. 2 and 4 as a function of strain and temperature.

Accordingly, the responses are approximately linear and the required inequality of Equation (1) is satisfied with the ratio differing from unity by greater than 10%, which is considered to provide satisfactorily resolved values of measured strain. The combined response is illustrated in the 3-dimensional graph of FIG. 8, in which the top plane 40 illustrates the center wavelength $\lambda_{BG}$ for the fiber Bragg grating sensor and the bottom plane 42 illustrates the center wavelength $\lambda_{FP}$ for the Bragg Fabry-Perot sensor as a function of both strain and temperature. Of course, for two associated sensors in the hybrid sensor having different center wavelengths, the two planes 40, 42 do not meet at the reference temperature and strain nor at any combination of anticipated temperature and strain. Both responses are observed to be substantially linear so the planes do not curve although a non-linear response is possible in some situations. As a result, all the data of FIG. 8 can be represented by four proportionality constants. The experimental equipment needs to be arranged so that both the FBG sensor and the BFP sensor are measured under equal strain and temperature. It can be mathematically demonstrated that for the linear responses of FIG. 8, as long as the inequality of Equation (1) is satisfied, any set of two center wavelengths $\lambda_{BG}, \lambda_{FP}$ corresponds to a single set of strain and temperature values.

A simplified configuration of the combination of sensors used to separate the effects of strain and temperature is one in which only two FBG sensors and one BFP sensor is formed in the fiber. That is, the BFP sensor is formed using two FBG units to form the partial reflectors of the Fabry-Perot cavity. The wavelength of the reflected maximum of either one of the FBG units can be tracked together with the reflected minimum (transmitted maximum) of the BFP. The computer algorithm used in this simplified configuration is effectively identical to that applied to the configuration in which the reflected minimum of a separate FBG is tracked, as described above.

Figure 9:
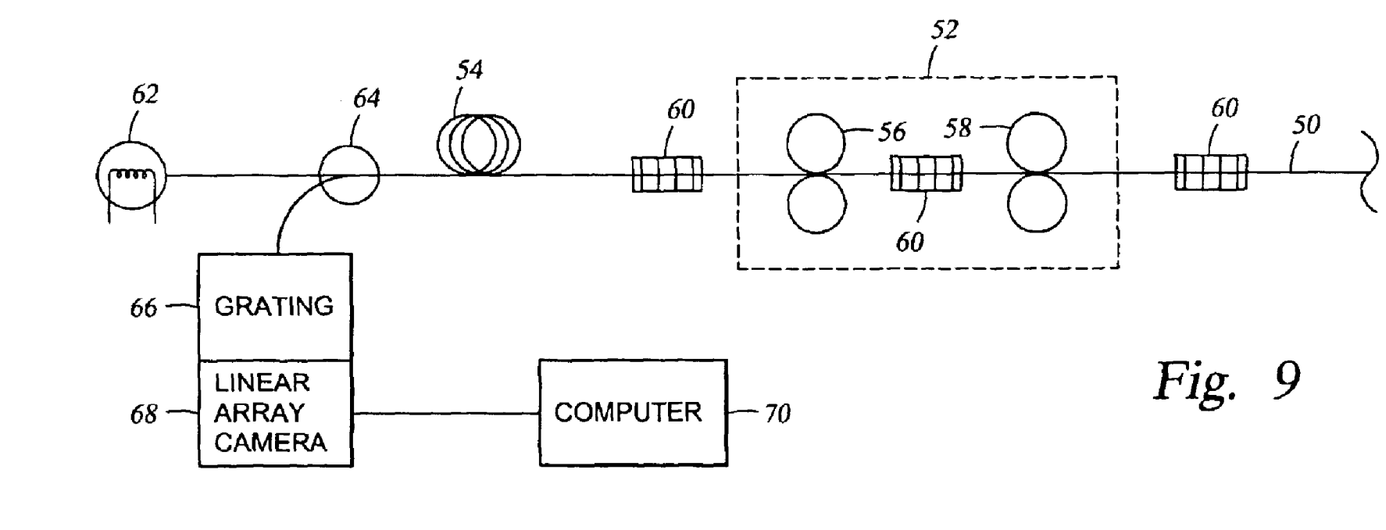
FIG. 9 is a schematic block diagram of an optical measurement system for measuring strain in the fiber of FIG. 1.

A system for measuring strain in a fiber is schematically illustrated in FIG. 9. An optical fiber 50 is pulled through a manufacturing process 52 from a payout spool 54. The fiber 50 is fixed on one side of the payout spool 54 but can be wound off the other side. The manufacturing process 52 is represented by two roller pairs 56, 58 which may impress strain of indeterminate strength on the fiber 50 strung between the two roller pairs 56, 58. However, the source of strain measurable by the invention is not so limited. It is also understood that the fiber can be heated and cooled as it passes through the manufacturing process. A number of hybrid sensors 60 are written onto the fiber at substantial separations, for example, of a meter or more. Each hybrid sensor 60 includes a fiber Bragg grating (FBG) sensor and a Bragg Fabry-Perot (BFP) sensor, and all the FBG and BFP sensors included along the fiber 50 have response bandwidths which do not overlap.

A broadband light source 62 outputs light of a broad spectrum that covers the response bandwidths of all the sensors. The broadband light is injected into the fixed end of the fiber 50 through an optical directional coupler 64. Each FBG or BFP sensor reflects a portion of the broadband light in a distinct reflection spectrum according to its current strain and temperature. The sensors reflect light back to the light source 62, but the directional coupler 64 directs a portion of the reflected light to a grating spectrometer 66 covering the entire spectrum of the sensors being probed. An optical amplifier can be inserted in the portion of the optical circuit between directional coupler 64 and grating spectrometer 66 to insure ample optical power, at the wavelengths of interest, is delivered to grating spectrometer 66. A linear array camera 68 receives all the spatially wavelength components from the grating spectrometer 66 and converts them to a set of electronic data corresponding to the intensities of the components. That is, the linear array camera 68 produces an electronic version of the optical spectrum of the reflected light. A computer 70 receives the output of the linear array camera 68 and processes the data to determine the center wavelengths of all the FBG and BFP gratings and hence their individual strains and temperatures.

An example of the linear array camera and spectrometer is an OMAV system available from Roper Scientific. It includes a 256-element linear array of InGaAs photodiodes resolving the spectrum across the array and accumulating photo charge over a sampling period. Such a system can acquire an entire reflection spectrum extending over 20 nm at a rate of 7.2 kHz. This sampling rate is adequate for dynamic monitoring of fiber being continuously processed at a pull rate of above 10 m/s.

However, the optical spectrum analyzer usable with the invention is not limited to that illustrated in FIG. 9. Other analyzers, particularly those utilizing additional optical effects, can be fabricated with sampling rates well above 7 kHz. Optical spectrum analyzers are known which have optical preprocessing, electronic dithering, and only one or two photo detectors to produce entire spectra at relatively high sampling rates.

The data will be acquired numerous times before the hybrid sensors 60 enter the manufacturing process 52, during the manufacturing process 52, and afterwards. It is expected that only during parts of the manufacturing process 52 will significant strain be measured.

The strain and temperature are measured relative to reference values, typically substantially zero strain and room temperature. More particularly, the shifts of the center wavelengths are measured relative to the values of the center wavelengths at zero strain and room temperature or other reference values. The reference center wavelengths can be determined by calculations for the sensors of predetermined construction. However, the same equipment shown in FIG. 9 can measure the center wavelengths on the windup spool 54 prior to fiber processing.

The response data for the multiple FBG and BFP sensors can be individually calculated or measured. Alternatively, the four proportionality constants represented by the linear responses of FIG. 8 can be calculated or measured for one generic FBG sensor and one generic BFP sensor for a particular fiber construction, and the proportionality constants can then be used to generate the effect of strain and temperature upon changes from the pre-measured reference center wavelengths.

The most immediate use of the hybrid strain sensor described above is to reserve a test fiber written with such sensors and substitute the test fiber for the production fiber for calibrating the manufacturing process and for monitoring its state. However, the strain sensors could be incorporated into a production fiber, either at one of the ends of a production spool or in a portion of the fiber bandwidth not to be used for commercial transmission, for example, outside of the bandwidth of the erbium-doped fiber amplifiers required for many applications. Out-of-band sensors can also be used for dynamic and continued testing of fibers installed, for example, undersea to monitor any undue stress encountered in inaccessible locations.

The hybrid sensor design of FIG. 1 shows the Bragg grating to be written within the Fabry-Perot cavity, but the detection mechanism does not require this placement. Instead, the fiber Bragg grating may be written on a different portion of the fiber than is the Fabry-Perot cavity. However, the illustrated design has the advantage that the fiber Bragg grating is experiencing substantially the same strain and temperature as is the Fabry-Perot cavity in which it is written. A typical length of a Bragg grating is about 1 cm. Hence, the hybrid sensor can be used to unambiguously measure similarly sized elements of the processing apparatus, for example, a single pulley around which the fiber is wrapped.

Figure 10:
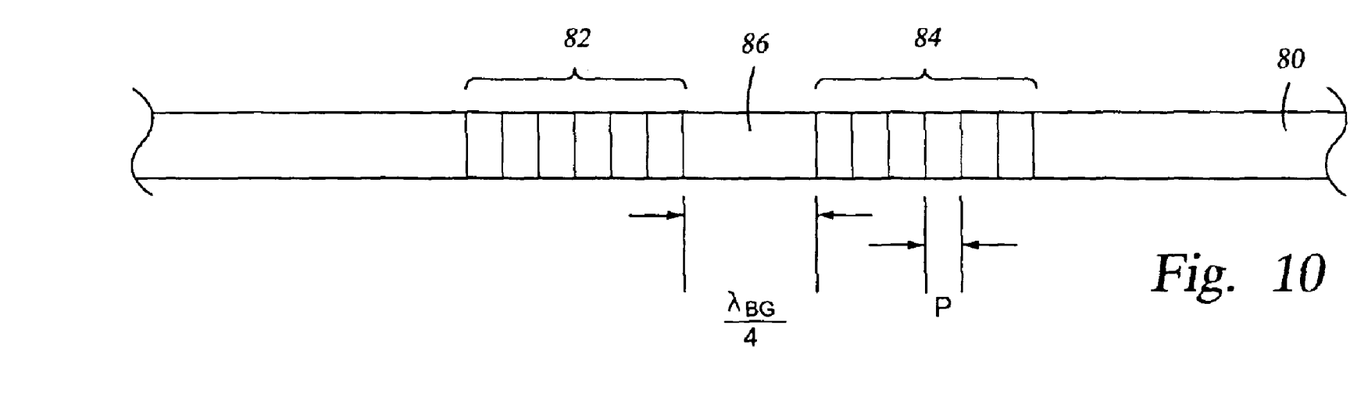
FIG. 10 is a schematic side view of an optical fiber on which is written an alternative sensor usable with the invention.

Other types of sensors may be used within the hybrid sensor. The reflectors of the Fabry-Perot sensor may be alternatively formed by semi-reflective layers, for example, of titanium dioxide spliced into the fiber. Although this fabrication process is more complex and reduces fiber strength, the Fabry-Perot reflection spectrum becomes much simpler without the Bragg reflector contribution. Alternatively, the Fabry-Perot cavity can be substantially reduced in a distributed feedback Bragg (DFB) structure illustrated in the schematic illustration of FIG. 10. A fiber 80 is written with two Bragg gratings 82, 84 of equal pitch P. Between the two gratings 82, 84, a quarter-wavelength gap 86 is formed having a separation between the centers of the nearest lines of the two gratings 82, 84 of $\lambda_{BG}/4$. Such a DFB structure has a reflection spectrum similar to that of the FBG spectrum of FIG. 2 except there is a sharp minimum (transmission peak) at the center of reflection peak 20. Changes in the transmission peak correlate with changes in the gap.

Although the method of practicing the invention has been described as monitoring shifts of the center wavelengths of the two sensor types, other types of reflection characteristics may be monitored and may include more than one characteristic value per measured spectrum.

It is of course appreciated that strain and stress are inextricably related, particularly for elastic strain with little or no permanent deformation, so that in most contexts the two measures are equivalent.

The invention thus provides a method of measuring strain in a fiber and easily separating out temperature effects using methods and instrumentation only slightly more complex than the prior art.

What is claimed is:

1. An optical fiber system used to measure strain induced therein, comprising:
    an optical fiber; and
    a first sensor and a second sensor formed along said optical fiber, each of said sensors producing a reflection spectrum when irradiated with broadband light, said first sensor comprising a Fabry-Perot sensor having two partial reflectors separated by a cavity portion, said second sensor including a Bragg grating written in said cavity portion;
    wherein a first reflection characteristic of said first sensor varies with strain according to a first dependence and with temperature according to a second dependence;
    wherein a second reflection characteristic of said second sensor varies with strain according to a third dependence and with temperature according to a fourth dependence; and
    wherein a ratio between said first dependence divided by said second dependence and said third dependence divided by said fourth dependence is not unity.

2. The optical fiber system of claim 1, wherein said ratio differs from unity by at least 10%.

3. The optical fiber system of claim 1, wherein said Bragg grating has a first reflection bandwidth and wherein said two partial reflectors comprise matched second Bragg gratings having a second reflection bandwidth outside of said first reflection bandwidth.

4. The optical fiber system of claim 1, wherein each of said wavelength characteristics is a central wavelength of a reflection spectrum associated with one of said sensors.

5. The optical fiber system of claim 1, wherein said first reflection characteristic varies within a first wavelength band and said second reflection characteristic varies with a second wavelength band outside of said first wavelength band.

6. The optical fiber system of claim 1, further comprising:
- a source of light having a spectrum extending over reflection spectra of said two sensors;
- directional coupler coupling said source of light into a first end of said fiber; and
- an optical spectrum analyzer receiving light from said fiber after interacting with both of said sensors.

7. The optical fiber system of claim 6, wherein said optical spectrum analyzer receives light from said first end of said fiber.

8. The optical fiber system of claim 6, wherein said optical spectrum analyzer spectrally resolves said received light at a sampling rate of at least 7 kHz.

9. A method of measuring strain in an optical fiber including a first sensor and a second sensor formed therein, said method comprising the steps of:
- irradiating said fiber with broadband light, said first sensor comprising a Fabry-Perot sensor having two partial reflectors separated by a cavity portion, said second sensor including a Bragg grating written in said cavity portion, each of said sensors when irradiated with said broadband light producing a reflection spectrum having a reflection characteristic, said reflection characteristics differing between said sensors and occupying different portions of a spectrum of said broadband light,
- measuring first and second reflection spectra produced by said first and second sensors respectively; and
- calculating from respective changes of said reflection spectra from said two sensors a strain to which said two sensors are subject,
- wherein a first one of said reflection characteristics varies with strain according to a first dependence and with temperature according to a second dependence;
- wherein a second one of said reflection characteristics sensor varies with strain according to a third dependence and with temperature according to a fourth dependence; and
- wherein a ratio between said first dependence divided by said second dependence and said third dependence divided by said fourth dependence is not unity.

10. The method of claim 9, further comprising during said irradiating and measuring steps continuously passing said fiber through a manufacturing process.

11. The method of claim 9, wherein a plurality said first and second sensors are formed at different locations in said fiber.

12. The method of claim 9, further comprising determining shifts in said reflection characteristics in said first and second reflection spectra and wherein said calculating step calculates said strain from said shifts.

13. The method of claim 9, wherein said calculating step removes effects of a temperature change to which said sensors are subject.

14. An optical fiber system used to measure strain induced therein, comprising:
- an optical fiber; and
- a first sensor and a second sensor formed along said optical fiber, said first sensor producing a first reflection and a first transmission spectrum and said second sensor producing a second reflection and a second transmission spectrum when irradiated with broadband light, said spectra having respective bandwidths; said first sensor is a Fabry-Perot cavity, the cavity being formed by a pair of Bragg gratings spaced apart from one another wherein,
- said first reflection spectrum is suppressed by at least 3dB in the bandwidth associated with said second reflection spectrum, and
- said first transmission spectrum is suppressed by at least 3dB in the bandwidth associated with said second transmission spectrum, and second sensor is regular Bragg grating wherein the reflection spectrum of said Fabry-Perot cavity has a free spectral range and the reflection spectrum of said spaced apart Bragg gratings forming the cavity have a bandwidth, and wherein the bandwidth of said Bragg gratings is greater than the Fabry-Perot cavity free spectral range;
- wherein, the first reflection spectrum of said first sensor varies with strain according to a first dependence and with temperature according to a second dependence and the second reflection spectrum of said second sensor varies with strain according to a third dependence and with temperature according to a fourth dependence;
  - and wherein a ratio between said first dependence, divided by said second dependence and said third dependence divided by said fourth dependence is not unity.

15. The optical fiber system of claim 14, wherein, the first transmission spectrum of said first sensor varies with strain according to a first dependence and with temperature according to a second dependence and the second transmission spectrum of said second sensor varies with strain according to a third dependence and with temperature according to a fourth dependence;
- and wherein a ratio between said first dependence divided by said second dependence and said third dependence divided by said fourth dependence is not unity.

16. The optical fiber system of claim 14, wherein the free spectral range of said Fabry-Perot cavity is delimited by local minimums and at least one of said local minimums is included within the bandwidth of said Bragg gratings.

17. The optical fiber system of claim 16, wherein, upon changes in applied stress or temperature of said Fabry-Perot cavity, said local minimums shift in wavelength, the bandwidth of said Bragg gratings and the free spectral range of said Fabry-Perot cavity selected such that as one of said local minimums shifts out of the bandwidth the other of said local minimums shifts into the bandwidth.

* * * * *